United States Patent
Lin et al.

(10) Patent No.: US 10,694,726 B2
(45) Date of Patent: Jun. 30, 2020

(54) EASY-TIE FISHING HOOK

(71) Applicants: Thomas Lin, Independence, MO (US); Chun Shiong Lin, Independence, MO (US); Jefferson Lin, Independence, MO (US); Philip Lin, Independence, MO (US); Ziu Eng Xu, Independence, MO (US)

(72) Inventors: Thomas Lin, Independence, MO (US); Chun Shiong Lin, Independence, MO (US); Jefferson Lin, Independence, MO (US); Philip Lin, Independence, MO (US); Ziu Eng Xu, Independence, MO (US)

( * ) Notice: Subject to any disclaimer, the term of this patent is extended or adjusted under 35 U.S.C. 154(b) by 314 days.

(21) Appl. No.: 15/635,902

(22) Filed: Jun. 28, 2017

(65) Prior Publication Data
US 2019/0000051 A1   Jan. 3, 2019

(51) Int. Cl.
*A01K 83/00* (2006.01)

(52) U.S. Cl.
CPC ..................................... *A01K 83/00* (2013.01)

(58) Field of Classification Search
CPC ......... A01K 83/00; A01K 83/04; A01K 91/04
See application file for complete search history.

(56) References Cited

U.S. PATENT DOCUMENTS

| | | | | |
|---|---|---|---|---|
| D33,775 S * | 12/1900 | Bower | ........................ | D22/144 |
| 1,670,185 A * | 5/1928 | Bond | ..................... | A01K 91/04 |
| | | | | 43/44.84 |
| 2,138,702 A * | 11/1938 | Litsey | ..................... | A01K 91/04 |
| | | | | 403/213 |
| 3,402,957 A | 9/1968 | Peterson | | |
| 4,028,838 A * | 6/1977 | Flower | ................... | A01K 83/00 |
| | | | | 43/43.16 |
| 4,161,840 A * | 7/1979 | Kidd | ....................... | A01K 83/00 |
| | | | | 43/37 |
| 4,535,562 A * | 8/1985 | Fry | ......................... | A01K 91/04 |
| | | | | 43/42.49 |
| 4,621,449 A | 11/1986 | Nakagawa | | |
| 5,237,772 A * | 8/1993 | Gibbs | .................... | A01K 83/00 |
| | | | | 43/43.16 |
| 5,279,067 A | 1/1994 | Tollison | | |
| 5,647,616 A | 7/1997 | Hamilton | | |
| 5,689,911 A | 11/1997 | Lin et al. | | |
| 5,970,650 A * | 10/1999 | Mammel | ................ | A01K 83/00 |
| | | | | 43/43.16 |
| 6,195,847 B1 * | 3/2001 | Shemberger | ........... | A01K 83/00 |
| | | | | 24/163 K |
| 6,334,273 B2 * | 1/2002 | Turner | ................... | A01K 91/04 |
| | | | | 43/44.83 |

(Continued)

*Primary Examiner* — Magdalena Topolski
(74) *Attorney, Agent, or Firm* — Egbert, McDaniel & Swartz, PLLC

(57) ABSTRACT

A fishing hook has a shank portion with a hook at one end, and a hairpin loop portion formed on an opposite end of the shank portion. The hairpin loop portion extending downwardly from the opposite end of the shank portion. The hairpin loop portion has a width or diameter that is less than a width or diameter of the shank portion. The hairpin loop portion has an end extending at an angle away from the shank. The hairpin loop portion has a longitudinal axis coplanar with a longitudinal axis of the shank portion. The shank portion and the hairpin loop portion define a line-receiving slot.

4 Claims, 4 Drawing Sheets

(56) References Cited

U.S. PATENT DOCUMENTS

| | | | |
|---|---|---|---|
| 6,560,916 B1 * | 5/2003 | Maxim | A01K 83/00 43/43.16 |
| 7,261,327 B1 | 8/2007 | Johnston | |
| 9,185,894 B1 | 11/2015 | Abdulrahman et al. | |
| 2004/0181994 A1 * | 9/2004 | Morrow | A01K 83/00 43/42.36 |
| 2015/0327525 A1 * | 11/2015 | Noack, Jr. | A01K 83/00 43/43.16 |

* cited by examiner

EASY-TIE FISHING HOOK

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to generally to fishing hooks. More particularly, the present invention relates to fishing hooks in which the fishing line can be easily attached to the fishing hook.

2. Description of Related Art Including Information Disclosed Under 37 CFR 1.97 and 37 CFR 1.98

Tying fishing lines to fish hooks presents many problems. The use of such lines makes knot tying difficult even under good conditions. With wet and/or cold hands, this problem is greatly magnified. Because of the popularity of fishing, much interest has been directed toward finding ways of simplifying the attachment of fishing lines to fishing hooks.

In the past, various patents have issued with respect to the easy-tying fishing hooks. For example, U.S. Pat. No. 4,621,449, issued on Nov. 11, 1986 to K. Nakagawa, shows a fishing hook provided with a mushroom-like stopper portion which is formed at the top end part of the stem of the main body for tying the fishing line. There is also a notch formed on the axis of the stem toward the upper end part of the stem reaching the top of the tying portion.

U.S. Pat. No. 5,279,067, issued on Jan. 18, 1994 to B. O. Tollison, shows an easy-tie fishhook and a method of attaching a line to a hooked item, such as a fishing hook, a plug, a gig, a lure or a spoon. Each hooked item includes an elongated shank and an open-ended slot disposed contiguous with one end of the shank. The slot is tapered and formed when the material from which the shank is fabricated is bent back onto itself. The slot has a slight divergence toward the top end of the slot. A line having a transverse cross-section with a radius approximately equal to the radius of curvature of the closed-end of the slot is employed. In order to attach the line to the hooked item, one must place an end of the line through the slot, run a portion of the line past the slot along the shank, wrap the line extending beyond this portion around it and the shank, and finally pulling the free end of the line into the slot and toward the closed end thereof of the slot. When the line is so pulled, it entwines upon itself, bunches and wedges into the slot.

U.S. Pat. No. 5,647,616, issued on Jul. 15, 1997 to H. W. Hamilton, discloses a fish hook dispenser and tying device. A hand-held implement of two pieces serves to tie, secure and dispense fish hooks. The implement includes a cylindrical longitudinal bore, a vertical safety chamber, and an extended sliding mandrel tying end. A top plane provides a vertical opening for the safety hook chamber, the threading line guide, and the vertical flute guide. The second part includes a cylindrical longitudinal helical mandrel, a vertical receiving hook flute, a spring chamber, and a sliding mandrel tying end. The helical spring provides actuating and biasing means that urges the barbed fish hook into the vertical safety hook chamber exposing a secure hook eyelet for tying. The sliding mandrel tying end extends beyond the implement end portion. The sliding helical mandrel extends the vertical receiving hook flutes to dispense the hook.

U.S. Pat. No. 7,261,327, issued on Aug. 28, 2007 to H. Johnston, teaches a fish hook tying apparatus. This fish hook tying apparatus includes a housing with a shaft mounted therein for rotation about a longitudinal axis. An end of the shaft protrudes from one end of the housing to form a chuck including resilient jaws and a longitudinally movable collar. The chuck is formed to grasp the shank of the fishing hook in a closed-jaw position and to release the fishing hook in an open-jaw position. A lanyard with a free end attached to the shaft has a wound-position and an unwound-position. A spring is attached to the shaft and to the housing so as to produce a winding bias on the shaft when the lanyard is moved from the wound-position to the un-wound position. The winding bias tends to rotate the shaft from the unwound position of the lanyard to the wound position of the lanyard.

U.S. Pat. No. 9,185,894, issued on Nov. 17, 2015 to Abdulrahman et al., provides an automatic fish hook tying device that includes a hollow housing with an elongated slot formed therein. A fish hook holding assembly near one end of the slot adjustably holds a fish hook therein with an eye of the fish hook extending into the housing. A fishing line feeding assembly near the opposite end of the slot positively feeds a fishing line through a fishing line guide assembly, threading the line through the eye. A winding and spooling assembly winds the line around a detachable spool and forms coils around a standing line to initiate formation of a knot. A manipulator assembly carries the spool to form loops and thread the line through the loops during the knot-tying process. Upon completion of the knot, the tied fishing hook can be removed from the housing through the slot.

U.S. Pat. No. 3,402,957, issued on Sep. 24, 1968 to N. C. Peterson, describes a fish hook threading and tying device. A mandrel is provided with a funnel-shaped socket for receiving the eye of a fish hook and guiding a line through the eye before the line is wound around the mandrel. The mandrel has a groove that one side thereof through which an end portion of the line may be passed to form a knot when the wound line is slipped off the mandrel. The socket is slit and resiliently yieldable to frictionally hold the fish hook in place.

An important development in easy-tie fish hooks is that of U.S. Pat. No. 5,689,911, issued on Nov. 25, 1997 to Lin et al. This patent describes a fishing hook having a shank portion with a hook at one end and a slotted portion formed at an end of the shank portion opposite the hook. The slotted portion has an area in surface-to-surface contact with a surface of the shank portion. The area in surface-to-surface contact with the surface of the shank portion is distal the end which is joined with the shank portion. The slotted portion includes a first end contiguously joined to the shank portion, a central portion extending from the first end and tapering inwardly toward the shank portion, and a second end extending outwardly from the shank portion at the area in surface-to-surface contact with the shank portion.

FIG. 1 shows this prior art easy-tie fish hook of U.S. Pat. No. 5,689,911. The easy-tie fishing hook 10 includes a shank portion 12 having a hook 14 at one end and a slotted portion 16 formed at an end of the shank portion 12 opposite the hook 14. The slotted portion 16 has an area 18 in surface-to-surface contact with a surface of the shank portion 12. A line-receiving opening 20 is formed in the area between the slotted portion 16 and the surface of the shank portion 12.

In FIG. 1, it can be seen that the slotted portion 16 includes a first end 22 which is contiguously joined to an upper end of the shank portion 12. A central portion extends from the first end 22 and tapers inwardly toward the shank portion 12. The area 18 is in surface-to-surface contact with the surface of the shank portion opposite the first end. The line-receiving opening 20 is defined by the area between the shank portion 12, the first end 22 and the central portion 16. A second end 24 extends outwardly from the shank portion 12 from the end of the central portion 16 that is in surface-to-surface contact with the shank portion 12. The second end 24 serves as a guide for allowing a fishing line to enter through the area 18 and into the line-receiving opening 20. The area between the first end 22 and the second end 24 needs to be flattened in order to increase its elasticity.

In normal use, a fishing line can be secured within the line-receiving opening 20 by extending a portion of the line along a surface of the shank portion 12, wrapping the line around the shank portion 12, and pulling the wrapped-around line upwardly into the line-receiving opening 20 through the area 18 in surface-to-surface contact. Since the area 18 is in surface-to-surface contact with the surface of the shank portion 12, it is difficult, if not impossible, for the fishing line (secured in the fishing line receiving opening 20) to slide downwardly and outwardly therethrough. The second end 18 serves as a guide to facilitate the insertion of the wrapped-around fishing line into the line-receiving opening 20.

One of the problems with this prior art easy-tie fishing hook is that it was extremely difficult to manufacture. Additionally, the slotted portion was too inflexible for line tying. The slotted portion 16 had no structure which allowed for the retention of live bait between the hook 14 and the slotted portion 16. Additionally, and furthermore, it was found that the widened and flattened slotted portion 16 was oddly unattractive to fish. In other words, it was easier for fish to recognize the irregularity in the surface of the fishing hook 10. This is particularly true since the slotted portion 16 is significantly wider than the shank of the fishing hook 10. As such, a need has developed so as to create an easy-tie fishing hook that is easier to manufacture, more flexible for line tying, and more attractive to fish.

It is an object of the present invention to provide easy-tie fishing hook that is easy to manufacture.

It is another object of the present invention to provide an easy-tie fishing hook that has sufficient flexibility so as to facilitate line tying.

It is still another object of the present invention to provide an easy-tie fishing hook that is better able to retain live bait thereon.

It is still a further object of the present invention to provide an easy-tie fishing hook that is more attractive to fish and enhances the results of fishing.

It is still a further object of the present invention to provide an easy-tie fishing hook that is relatively inexpensive and is easy-to-use.

These and other objects and advantages of the present invention will become apparent from a reading of the attached specification and appended claims.

BRIEF SUMMARY OF THE INVENTION

The present invention is a fishing hook that comprises a shank portion having a hook at one end, and a hairpin loop portion formed at an opposite end of the shank portion. As used herein, the term "fishing hook" includes fish hooks, jigs, swivels, lead weights or fishing lures. The hairpin loop portion extends downwardly from the opposite end of the shank so as to be in close proximity to the shank portion. The hairpin loop portion has a width or diameter that is less than a width or diameter of the shank portion. The hairpin loop portion has an end extending at an angle away from the shank.

In one embodiment of the present invention, the width or diameter of the hairpin loop portion narrows from the opposite end of the shank portion toward the end of the hairpin loop portion. The hairpin loop portion continuously narrows in width or diameter from the opposite end of the shank portion. The hairpin loop portion has a longitudinal axis that is coplanar with the longitudinal axis of the shank portion. The end of the hairpin loop portion extends downwardly at an obtuse angle from a remainder of the hairpin loop portion. The shank end the hairpin loop portion define a line-receiving slot. The end of the hairpin loop portion defines a funnel area toward the line-receiving slot.

In a first alternative embodiment of the present invention, the hairpin loop portion has a generally constant width or diameter. The end of the hairpin loop portion extends away from the shank at an acute angle with respect to a remaining portion of the hairpin loop portion.

In a second alternative embodiment of the present invention, the hairpin loop portion is formed of a polymeric material. The hairpin loop portion is molded onto the opposite end of the shank. In particular, the polymeric material of the hairpin loop portion extends along at least a portion of the shank from the opposite end of the shank portion in a direction toward the hook. The end of the hairpin loop portion extends at an obtuse angle from a remaining portion of the hairpin loop portion. The opposite end of the shank curves outwardly away from the remaining portion of the shank.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
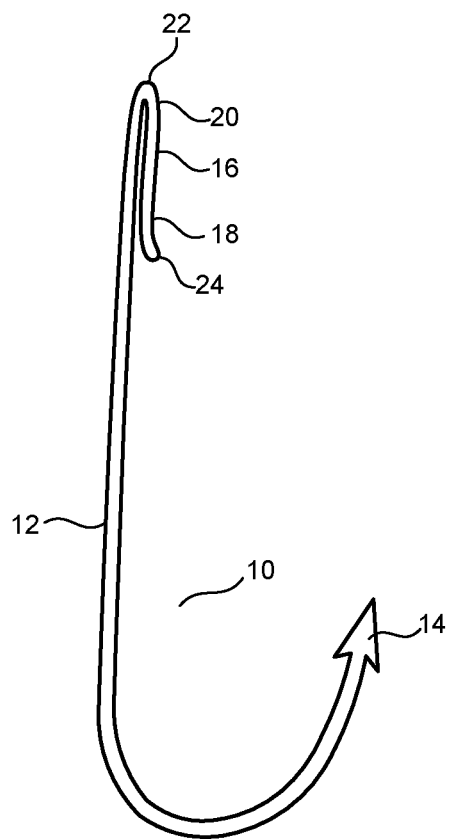
FIG. 1 is a side elevational view of a prior art easy-tie fishing hook.
Figure 2:
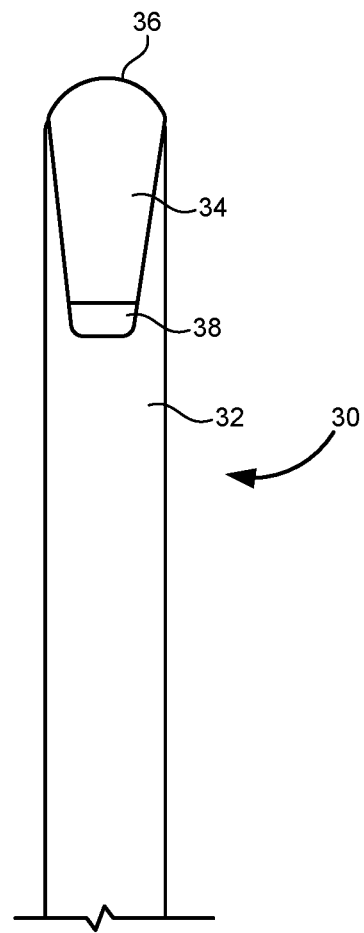
FIG. 2 is a frontal view of a first embodiment of the easy-tie fishing hook of the present invention.

Referring to FIG. 2, there is shown the easy-tie fishing hook 30 in accordance with a first embodiment of the present invention. As used herein, the term "fishing hook" includes fish hooks, jigs, swivels, lead weights, or fishing lures. The easy-tie fishing hook 30 has a shank portion 32 having a hook at one end thereof. The hook of the shank portion 32 will be identical to that of the hook 14 shown in FIG. 1. Similarly, the curvature of the shank portion 32 at the lower end thereof adjacent to the hook will be identical to the configuration shown in FIG. 1. Importantly, the improvement of the present invention that is shown in FIG. 2 is the configuration of the hairpin loop portion 34 that is formed at an opposite end of the shank portion 32 from the hook. The hairpin loop portion 34 is illustrated as extending downwardly from the opposite end 36 of the shank portion 32. It can be seen that the hairpin loop portion 34 has a width or diameter that is less than a width or diameter of the shank portion 32. The hairpin loop portion 34 has an end 38 that extends at an angle away from the shank portion 32.

In FIG. 2, it can be seen that the hairpin loop portion 34 has a longitudinal axis that is coplanar with the longitudinal axis of the shank portion 32. Since the hairpin loop portion 34 has a width or diameter that is less than the width or diameter of the shank portion 32, the hairpin loop portion has no surfaces that extend outwardly beyond the sides of the shank portion 32. As such, this hairpin loop portion 34 is more concealed from viewing by a fish. Unlike the prior art shown in FIG. 1, the hairpin loop portion 34 is not spread out and does not present sharp edges or structures that can be more easily visible by the fish.

During the manufacturing process, the hairpin loop portion 34 can be suitably flattened prior to bending. After the hairpin loop portion 34 is flattened, it can be bent over in a conventional manner so as to reside in close proximity to the shank portion 32. As such, a line-receiving slot would be defined between the hairpin loop portion 34 and the shank portion 32.

Figure 3:
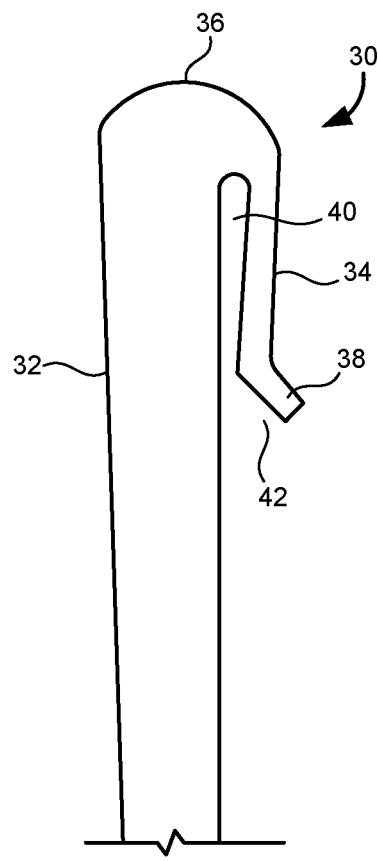
FIG. 3 is a side elevational view of the first embodiment of the easy-tie fishing hook of the present invention.

FIG. 3 is a side view of the easy-tie fishing hook of the first embodiment of the present invention. In FIG. 3, it can be seen that the hairpin loop portion 34 extends outwardly in relation to the shank portion 32. In particular, the hairpin loop portion 34 extends downwardly from an upper end 36 of the shank portion 32. The hairpin loop portion 34 will gradually move inwardly so as to be in close proximity to a surface of the shank portion 32. As such, a line-receiving slot 40 is defined between the shank portion 32 and the hairpin loop portion 34.

The end 38 of the hairpin loop portion 34 extends downwardly at an obtuse angle from the remainder of the hairpin loop portion 34. As such, a funnel-type opening 42 will lead into the line-receiving slot 40. This funnel-type opening 42 facilitates the ability to introduce the fishing line into the line-receiving slot 40. The bending of the end 38 can occur during the manufacturing process when the hairpin loop portion 34 is flattened. The tying of the fishing line onto the fishing hook 30 will be similar to that described in association with FIG. 1 hereinbefore.

Figure 4:
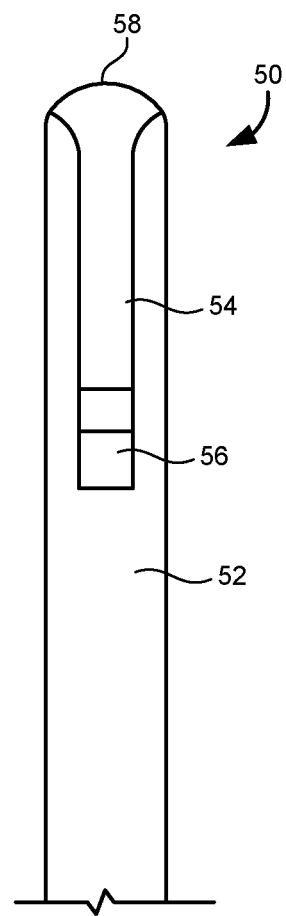
FIG. 4 is a frontal view of a first alternative embodiment of the easy-tie fishing hook of the present invention.

FIG. 4 shows the easy-tie fishing hook 50 in accordance with a first alternative embodiment of the present invention. In FIG. 4, it can be seen that the easy-tie fishing hook 50 includes a shank portion 52 and a hairpin loop portion 54. The hairpin loop portion has an end 56 which is opposite to the end 58 of the shank portion 52. The hairpin loop portion 54 has a generally constant diameter extending downwardly from the end 58 of the shank portion 52. Once again, this configuration allows the hairpin loop portion to reside within the area defined by the width or diameter of the shank portion 52. This creates a certain amount of "invisibility" to fish.

Figure 5:
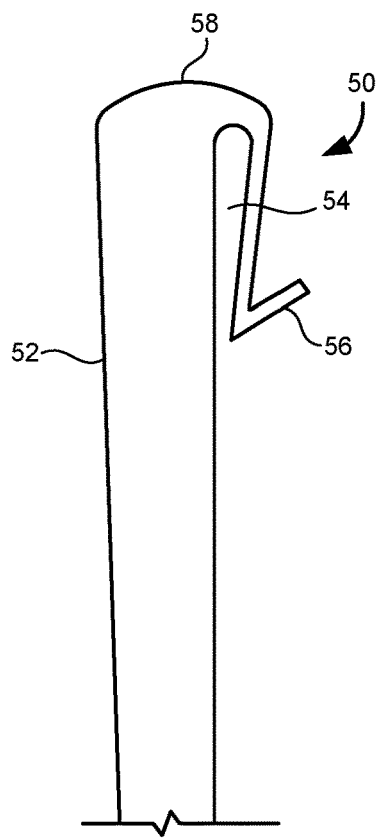
FIG. 5 is a side elevational view of the first alternative embodiment of the easy-tie fishing hook the present invention.

FIG. 5 shows a side view of the easy-tie fishing hook 50 in accordance with this first alternative embodiment of the present invention. FIG. 5 shows that the hairpin loop portion 54 extends downwardly from the end 58 of the shank portion 52. The end 56 of the hairpin loop portion 58 extends at an acute angle with respect to the remaining portion of the hairpin loop portion 54. This type of angling of the end 56 facilitates the ability to secure a bait to the fishing hook 50. In other words, if bait is used, a portion of the bait can be secured to the barb 14 and to the upwardly turned end 56. The bait can be live bait, lures, plastic worms, or other synthetic bait. FIG. 5 also shows that the hairpin loop portion 54 has been flattened in the manufacturing process. This flattening of the hairpin loop portion 54, along with the narrow width or diameter of the hairpin loop portion 54, enhances flexibility when securing a line thereto. Unlike the prior art, the hairpin loop portion 54 provides great flexibility so as to assist the fisherman in tying the line to the fishing hook 50.

Figure 6:
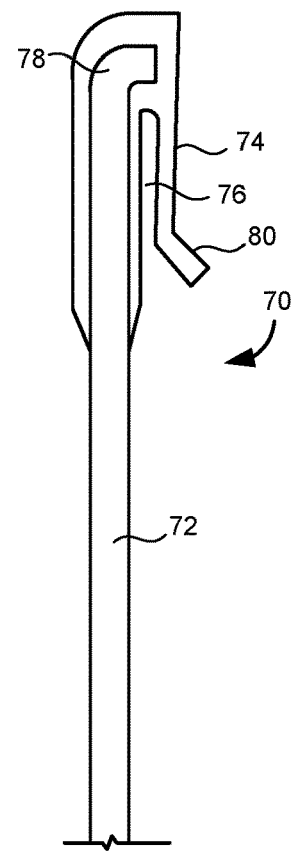
FIG. 6 is a cross-sectional side view of the easy-tie fishing hook in accordance with a second alternative embodiment of the present invention.

FIG. 6 shows the easy-tie fishing hook 70 in accordance with a second alternative embodiment of the present invention. In FIG. 6, the easy-tie fishing hook 70 has a shank portion 72 and a hairpin loop portion 74. The hairpin loop portion 74 and the shank portion 72 define a line-receiving slot 76 therebetween.

Importantly, in FIG. 6, it can be seen that the hairpin loop portion 74 is formed of a polymeric material. The polymeric material is molded onto the upper end 78 of the shank portion 72. In particular, the upper end 78 of the shank portion 72 slightly curves outwardly from the longitudinal axis of the shank portion 72. This curvature enhances the ability to secure the polymeric material of the hairpin loop portion 74 onto the upper end 78 of the shank portion 72. The polymeric material of the hairpin loop portion 74 extends along at least a portion of the length of the shaft portion 72 so as to further enhance the attachment forces between the polymeric material of the hairpin loop portion 74 and the shank portion 72. The hairpin loop portion 74 has an end 80 that extends outwardly at an obtuse angle with respect to the remaining portion of the hairpin loop portion 74.

Figure 7:
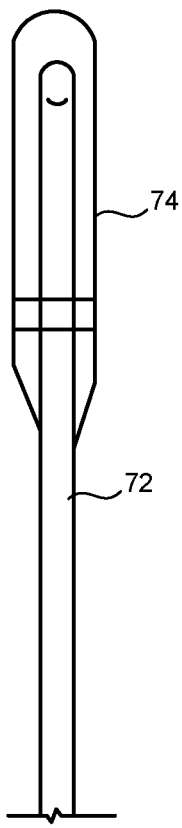
FIG. 7 is a transparent frontal view of they easy-tie fishing hook of the second alternative embodiment of the present invention.

FIG. 7 shows how the hairpin loop portion 74 is molded to the shank portion 72. In this embodiment, the hairpin loop portion 74 will have a width or diameter that is greater than the width or diameter of the shaft portion 72. This molding process can help to enhance the flexibility of the hairpin loop portion 74. The polymeric molding of the hairpin loop portion 74 also can be of various colors which can be attractive to fish. It is believed that the molding of the hairpin loop portion 74 to the shank portion 72 can be carried out in a very easy manufacturing process and with minimal costs. As such, the flattening processes associated with forming the fishing hook of the previous embodiment can be avoided.

Figure 8:
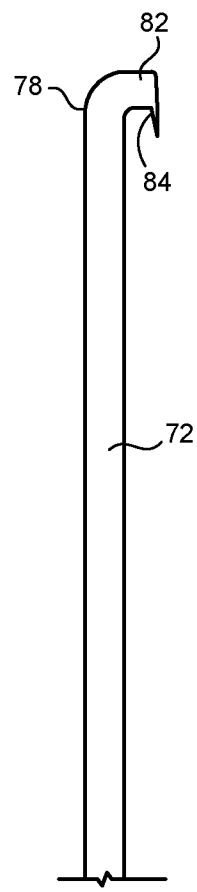
FIG. 8 is a side elevational view of the shank portion of the easy-tie fishing hook of the second alternative embodiment of the present invention.

FIG. 8 shows the configuration of the shank 72 without the polymeric material of the hairpin loop portion 74 thereon. It can be seen that there is a curved portion 82 at the upper end 78 of the shank portion 72. This curvature creates a grasping area 84 so as to enhance the attachment forces between the polymeric material of the hairpin loop portion 74 and the shank portion 72.

The foregoing disclosure and description of the present invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A fishing hook comprising:
   a shank having a hook at one end thereof, the hook extending in a direction from the one end of said shank portion; and
   a hairpin loop portion formed at an opposite end of said shank and extending in the direction of the hook, said hairpin loop portion extending downwardly from said opposite end of said shank, said hairpin loop portion being flattened and having a width that is less than a diameter of said shank, said hairpin loop portion having an end extending at an angle away from said shank, the width of said hairpin loop portion continuously narrowing from said opposite end of said shank toward the end of said hairpin loop portion, said shank and said hairpin loop portion defining a line-receiving slot, the end of said hairpin loop portion defining a funnel area toward the line-receiving slot.

2. The fishing hook of claim 1, said hairpin loop portion continuously narrowing in width or diameter from the opposite end of said shank.

3. The fishing hook of claim 1, said hairpin loop portion having a longitudinal axis coplanar with a longitudinal axis of said shank.

4. The fishing hook of claim 1, said end of said hairpin loop portion extending downwardly at an obtuse angle from a remainder of said hairpin loop portion.

* * * * *